(12) United States Patent
Menzer et al.

(10) Patent No.: US 6,468,683 B1
(45) Date of Patent: Oct. 22, 2002

(54) METHOD AND DEVICE FOR OPERATING A DIRECT METHANOL FUEL CELL WITH GASEOUS FUEL

(75) Inventors: Reinhard Menzer, Jülich; Bernd Hohlein, Linnich, both of (DE)

(73) Assignee: Forschungszentrum Julich GmbH, Julich (DE)

(*) Notice: Subject to any disclaimer, the term of this patent is extended or adjusted under 35 U.S.C. 154(b) by 0 days.

(21) Appl. No.: 09/600,804
(22) PCT Filed: Jan. 19, 1999
(86) PCT No.: PCT/DE99/00155
§ 371 (c)(1), (2), (4) Date: Jul. 20, 2000
(87) PCT Pub. No.: WO99/38223
PCT Pub. Date: Jul. 29, 1999

(30) Foreign Application Priority Data

Jan. 21, 1998 (DE) .......................... 198 02 038

(51) Int. Cl.[7] .............................. H01M 8/04
(52) U.S. Cl. ................................. 429/26; 429/34
(58) Field of Search ......................... 429/19, 20, 26, 429/34

(56) References Cited

U.S. PATENT DOCUMENTS 3,977,902 A * 8/1976 Sauer et al. ............... 429/34
5,573,866 A * 11/1996 Van Dine et al. .......... 429/13
6,110,613 A * 8/2000 Fuller ........................ 429/17
6,296,959 B2 * 10/2001 Takabe et al. ............ 429/20 X

FOREIGN PATENT DOCUMENTS

| JP | 63-237363 | 3/1988 |
| JP | 04249865 | 9/1992 |
| JP | 053430085 | 12/1993 |
| JP | 07-321320 | 5/1995 |
| JP | 08321320 | 12/1996 |
| WO | WO 97/50140 | 12/1997 |

OTHER PUBLICATIONS

Abstract for Japanese 63-237,363 (Kumagai et al.) Oct. 1988.*
Translation of Japanese 08-321,320 (Doi) Dec. 1996.*
"A vapour-feed direct methanol fuel cell . . . " by Shukla et al. (Journal of Power Sources 55(1995)May No. 1).
"Performance and modelling of a direct methanol solid polymer . . . " by K. Scott et al. (Journal of Power Sources 65 (1997). (Month unknown).

* cited by examiner

*Primary Examiner*—Stephen Kalafut
(74) *Attorney, Agent, or Firm*—Herbert Dubno

(57) ABSTRACT

The invention relates to a method for operating a direct methanol fuel cell. A cooling agent is vaporized in the fuel cell, and a methanol-water mixture is vaporized in a vaporizer, using excess heat from the fuel cell. The vaporized mixture is then conveyed to the anode chamber of the fuel cell.

4 Claims, 2 Drawing Sheets

METHOD AND DEVICE FOR OPERATING A DIRECT METHANOL FUEL CELL WITH GASEOUS FUEL

CROSS REFERENCE TO RELATED APPLICATION

This application is a national stage of PCT/DE99/00155 filed Jan. 19, 1999, and based upon German application 198 02 038.4, filed Jan. 21, 1998, under the International Convention.

FIELD OF THE INVENTION

The invention relates to a method and an apparatus for operating a direct methanol fuel cell with gaseous fuel.

BACKGROUND OF THE INVENTION

A fuel cell is an electrochemical converter in which, without recirculation of heat and mechanical energy, electrical energy can be recovered directly from a fuel and an oxidation agent. It is comprised of a cathode, an anode and an electrolyte lying therebetween. The oxidation agent (e.g. air) is fed to the cathode and the fuel (e.g. methanol) is fed to the anode. The cathode and anode in the fuel cell have continuous porosity as a rule so that the two operating agents (fuel and oxidation agent) can reach the electrolyte and the reaction products carried away. Carbon dioxide is a typical reaction product at the anode side. At the cathode side water is produced.

Fuel cells are known from the publication DE 195 31 852 C1 in which proton-conductive membranes are used as an electrolyte and which are operated at temperatures of 100° C. At the anode of such a fuel cell, protons are formed in the presence of the fuel by means of a catalyst. The protons traverse the electrolyte and bind at the cathode side with the oxygen stemming from the oxidation agent to form water. Electrons are thereby liberated and electrical energy produced.

Heat is generated in a fuel cell. This heat is, as a rule, carried off by a coolant flowing through the fuel cell. For this purpose a fuel cell is provided with coolant lines. The temperature of the coolant fed into the coolant lines lies below the working temperature of the fuel cell.

With a so-called "direct methanol fuel cell," methanol together with water are converted at the anode to protons and carbon dioxide. The protons pass the electrolyte and are converted in the aforementioned form at the cathode to water. The carbon dioxide is carried away out of the anode compartment in gaseous reaction products. The direct methanol fuel cell is hereinafter referred to as DMFC.

It is basically possible to operate a DMFC with a liquid or vapor form mixture of methanol and water.

It is a disadvantage in the operation of a DMFC with liquid fuel that carbon dioxide forms as a second gaseous phase. The carbon dioxide formed immediately proximal to the electrolyte must be discharged through the pores of the anode at the region of the reaction. This restricts the uniform supply of the liquid fuel to the electrolyte. The power output of the fuel cell is as a consequence reduced.

Along the transport path of the fuel through the anode compartment the proportion of the gaseous phase continuously increases. There thus arises a very different distribution of the two phases (liquid and gaseous) in the anode compartment.

The dropping volume proportion of the liquid phase (formed by the fuel and the water) along the anode compartment gives rise to an increasing vaporization of the original liquid phase.

The anode compartment divides itself into two regions by the aforementioned dropping volume proportion and the thus associated increased vaporization. In a first region, the electrolyte is wetted with a fuel/water mixture. In the second or following region the electrolyte is not wetted with liquid.

Transport of liquid and of gaseous substances in a porous system run quite differently. If a liquid and a gaseous phase adjoin one another substantially only a gas transport through the pores which are not wetted with liquid occurs. The pores filled with liquid are generally not traversed by gas because of the high pressure loss in the gas. The different conditions in the anode compartment give rise to power losses.

At a suitably high pressure in the anode compartment, the aforedescribed distribution into two regions can be counteracted.

A higher pressure in the anode compartment has the disadvantage of increasing the permeation of fuel and water through the electrolyte. Power losses are the result. A higher pressure in the anode compartment in addition mechanically stresses the electrolyte membrane and gives rise, inter alia, to rupture.

The aforedescribed effects based upon a higher pressure at the anode side can be avoided by a suitably high pressure on the cathode side. An effort must be made to suitably increase the pressure on the cathode side. The efficiency of the fuel cell is correspondingly reduced.

An increased pressure, however, influences positively the transport and electrochemical processes in the porous cathode layer. Thus the efficiency is increased.

The pressure on the cathode side of a fuel cell of the type DMFC with a membrane serving as the electrolyte which is chosen based upon the aforedescribed counteracting effects is preferably 200 to 250 kPa. Typically the pressure at the anode side of a fuel cell is 30 kPa less than that on the cathode side.

If a vapor form methanol-water mixture is introduced into the anode compartment of a DMFC, there is only one gaseous phase available. Two phases are thus avoided in a simple manner along with the above-mentioned drawbacks.

OBJECT OF THE INVENTION

It is the object of the invention to provide a method for efficient operation of a DMFC and to provide an apparatus for carrying out the method.

SUMMARY OF THE INVENTION

The method of operating a direct methanol fuel cell of the invention uses the steps of:

evaporating a coolant in the fuel cell, vaporizing a methanol-water mixture in an evaporator utilizing heat from the fuel cell, and feeding the vaporized water methanol-water mixture to the anode compartment of the fuel cell.

Under the term "evaporator" (evaporator unit), a device is to be understood in which the liquid evaporates.

In the method according to the claims, coolant is evaporated in the fuel cell. The evaporated coolant is fed in a first alternative to a heat exchanger. The heat exchanger is a component of an evaporator unit. By condensation in the heat exchanger, the heat is released at the evaporator unit at a substantially constant temperature. The phase transformation between vapor or gas and liquid is thus used to transmit heat from the DMFC to the evaporator. At the same time an approximately constant temperature is maintained.

In the evaporator unit, a methanol-water mixture is evaporated. The heat exchanger thus transfers heat to the methanol-water mixture. The evaporation temperature lies, during this operation, below the condensation temperature of the coolant used.

Suitable coolants are basically all liquids which can boil in the foreseen temperature range. This can be at ambient pressure (standard pressure) although it can also be the case in superambient or subambient pressure ranges.

For example the following:

| Liquid | Boiling Temperature/° C. | Pressure/kPa | Operating Temperature of the Cell/° C. |
|---|---|---|---|
| Water | 90 | 70 | 100 |
| Methanol | 90 | 255 | 100 |
| Ethanol | 90 | 158 | 100 |

The evaporated methanol-water mixture is then fed into the anode compartment of the fuel cell.

In a second alternative, the methanol-water mixture and the liquid coolant which is evaporated in the fuel cell are identical. The external evaporator with the heat exchanger are omitted. The fuel cell functions simultaneously as the evaporator. The evaporated mixture is then fed to the anode compartment.

With the process according to the invention, as a consequence, in an especially simple manner, a predetermined temperature can be maintained in the evaporator unit. With the method it can be ensured that no liquid superheating arises in the evaporator. A superheating can operate to cause a coking of the methanol. Coked methanol can no longer be transformed to hydrogen. The electric current yield is correspondingly reduced.

With the evaporation according to the invention of the methanol-water mixture before admission into the anode compartment of the fuel cell it can be ensured in an energetically effective manner that a liquid phase will not arise disadvantageously in the anode compartment. The heat which results from the operation of the fuel cell is then utilized for the evaporation. The system does not usually require any additional heat to be supplied.

To be able to convert the methanol completely, the molar proportion of the water-methanol water mixture must be at least equal to the molar proportion of ethanol. Advantageously as a rule, the molar proportion of water in the methanol-water mixture predominates.

When the molar mixing ratio of water:methanol=1.5, a complete evaporation at a total pressure of 10 kPa on the anode side is possible only when the temperature is significantly above typical operating temperatures of the DMFC. The desired heat flow from the fuel cell to the methanol-water mixture with consequent evaporation requires however only that the operating temperature of the DMFC lie above the evaporating temperature.

Liquids are completely evaporated when a temperature associated with a certain pressure is exceeded or the pressure is reduced below a pressure associated with a certain temperature.

The complete evaporation of the methanol-water mixture can thus be effected at a given temperature by adjustment of a suitable partial pressure of the mixture. In a preferred embodiment of the method, therefore, a carrier gas is added to the methanol-water mixture before the evaporation. The carrier gas is so selected that it is inert. $CO_2$ is inert and is thus suitable. With the aid of the carrier gas, the partial pressure of the methanol-water mixture is so adjusted that a complete evaporation of the methanol-water mixture is achieved at a predetermined temperature. The predetermined temperature lies (somewhat) below the condensation temperature of the coolant.

In a preferred embodiment of the invention, the $CO_2$ arising in the anode compartment is introduced as the carrier gas. It is thus fed to the evaporator unit. In this embodiment, inert carrier gas need not be separately prepared. This embodiment is especially disadvantageous in mobile applications.

The $CO_2$ arising in the anode compartment can be used as a carrier gas for vaporization independently from the other method steps.

In a further advantageous embodiment of the method the fuel cell is cooled with a boiling liquid. This expression should be understood to mean that the liquid, already upon entry into the fuel cell is at boiling temperature.

Instead of being heated up in a fuel cell, the boiling liquid is transformed at approximately the same temperature into vapor. As a result, no temperature gradient develops in the fuel cell. Temperature gradients reduce the power output and the life of a fuel cell.

The apparatus of the invention encompasses an evaporator unit in which the methanol-water mixture is vaporized before entering the anode compartment of the fuel cell. The device has means for transferring the surplus heat of the fuel cell to the methanol-water mixture.

The apparatus can encompass means whereby the coolant leaving the fuel cell is fed to the heat exchanger. The discharged coolant is then fed to the heat exchanger of the evaporator unit and is used for vaporization of the methanol-water mixture. It can thus be ensured in an energetically satisfactory way that no disadvantageous liquid phase will arise in the anode compartment.

According to an advantageous embodiment of the apparatus, the apparatus has means to supply $CO_2$ as a carrier gas to the evaporator unit, the $CO_2$ arising in the anode compartment of the fuel cell.

In a further advantageous embodiment of the invention the coolant lines in the fuel cell serve simultaneously as the evaporator for the methanol-water mixture. The coolant is then fed to the fuel cell upon discharge from the coolant lines of the anode compartment. In this manner an especially high degree of efficiency is obtained.

Advantageously, in the last-mentioned embodiment, $CO_2$ produced in the anode compartment is fed by corresponding means to the coolant lines.

In a further advantageous embodiment, the claimed apparatus has pumps for generating the desired pressures or flow velocities of the coolant.

SPECIFIC DESCRIPTION

Figure 1:
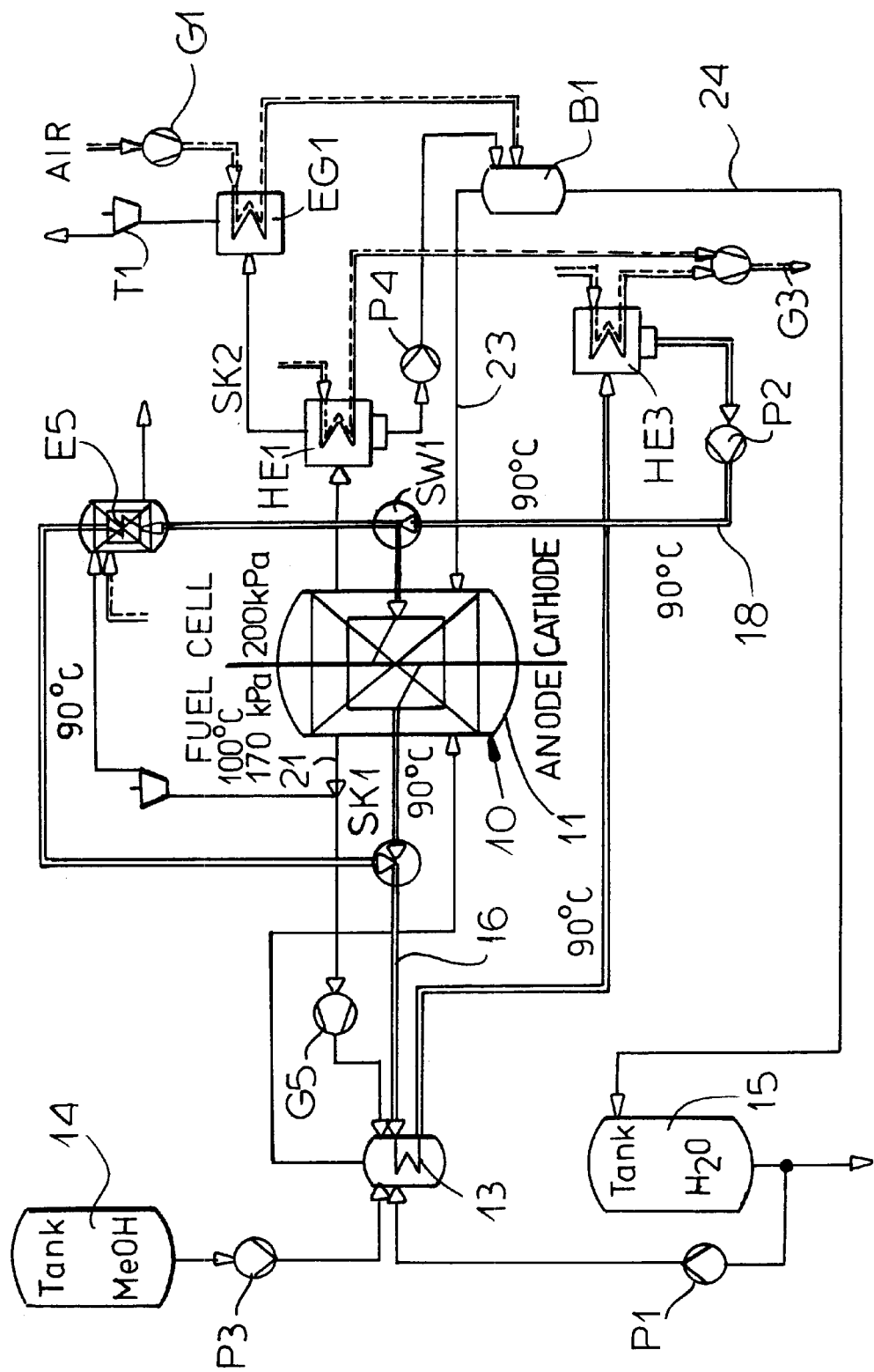
FIG. 1 is a flow diagram of the apparatus of the invention.
Figure 2:
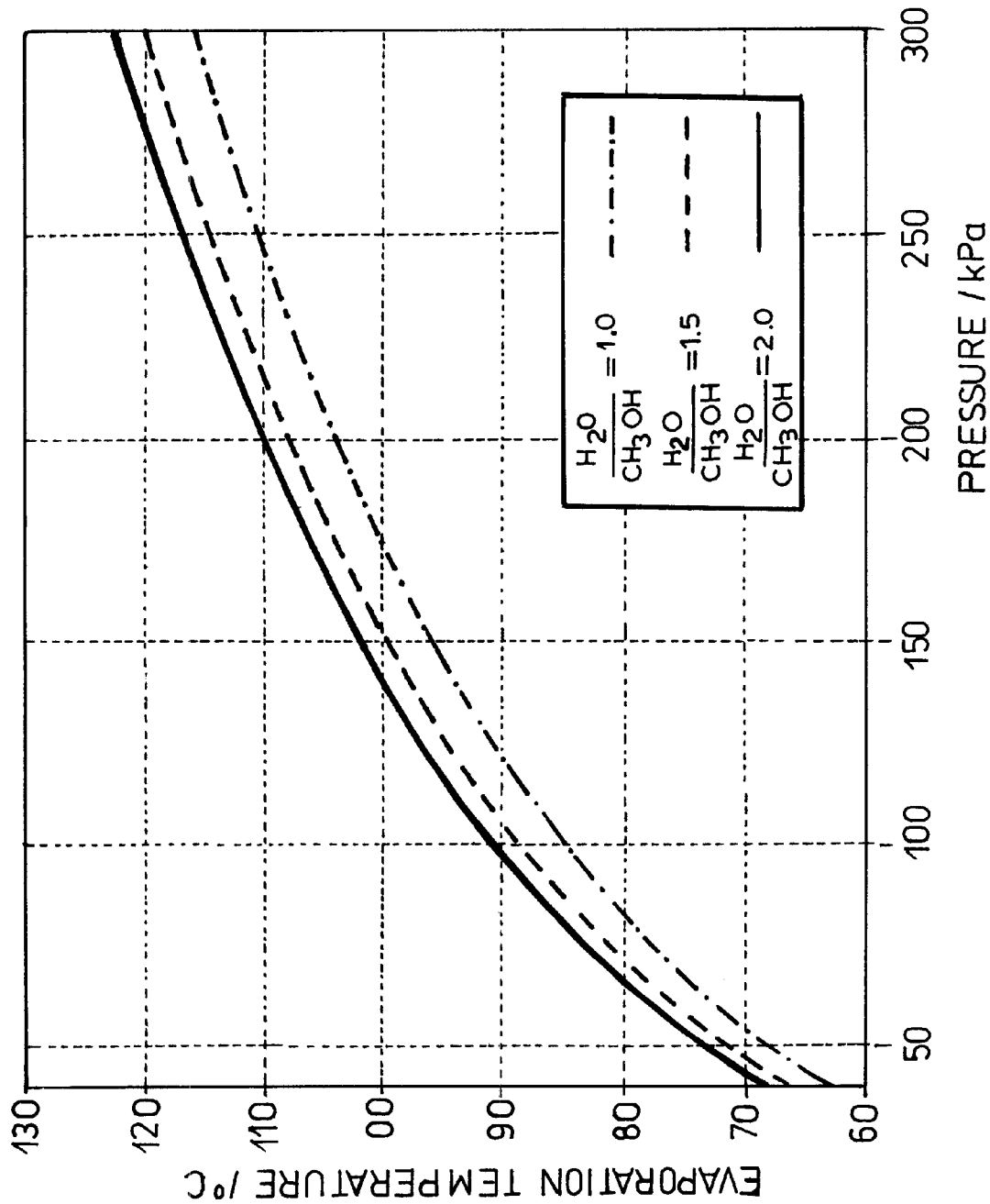
FIG. 2 is a graph of the evaporation characteristics of the methanol-water mixture.

FIG. 1 of the drawing shows a fuel cell 10 having an anode compartment 11 and a cathode compartment 12, an evaporator V1 and tanks 14 and 15 respectively supplying methanol and water via pumps P3 and P1 to the evaporator V1, thereby forming a methanol-water mixture therein.

The evaporator V1 has a heat exchanger 13 which is supplied with coolant by a line 16. The coolant then passes via line 17 to a heat exchanger HE3 from which it is displaced by pump P2 through line 18 to a stream divider SW1. Part of the coolant is then passed through the fuel cell 10 to a line 19 and the stream combiner 20 to line 16. Another part is passed through a heat exchanger portion E5 of a catalytic converter K1 and then to the stream combiner 20.

Inert gas, e.g. carbon dioxide, is withdrawn from the anode compartment 11 by line 21 and fed to a stream divider SK1 from which a blower/compressor G5 supplies a portion to the evaporator 13. Another portion is passed to the catalytic converter K1.

The cathode compartment 12 is connected by line 22 to the heat exchanger HE1 from which a liquid phase is displaced by pump P4 to moistening unit B1 to moisturize air delivered by the compressor Gi through the heat exchanger EG1. The latter abstracts heat from the gas phase supplied by line SK2 from heat exchanger HE1 before it is discharged through the discharged air turbine T1.

From the moisturizer B1, moisturized air is fed to the cathode compartment by line 23 and liquid is supplied to the water tank 15 by line 24.

In a DMFC, carbon dioxide arises at the anode side. This must be removed from the fuel cell in order to maintain the operation.

A part of the carbon dioxide product is thus continuously removed from the system at the location SKI. This part is released into the environment after cleaning in a catalytic converter, for example, an exhaust gas catalyst.

Another part of this product is fed, after compression (G5) for the purpose of overcoming the pressure loss, to the evaporator V1.

Water and methanol in a ratio of 1.5 is fed to the evaporator. The evaporator V1 contains the heat exchanger 13. With the aid of the heat exchanger 13, heat is transferred to the methanol-water mixture to be evaporated. Surplus heat of the DMFC is transferred with the coolant. The portion of the initial liquid coolant is vaporized in the DMFC. The vapor is fed to the heat exchanger, condensed and thus transfers heat from the DMFC to the methanol-water mixture. In the overall process cooling medium of the fuel cell is maintained at approximately the same temperature. For example with the operating temperature of the DMFC of 100° C., a coolant temperature of 90° C. can be maintained.

The amount of carbon dioxide fed to the evaporator can be freely selected over a wide range. By a corresponding choice, the fraction of the methanol-water mixture can be so formed that with complete evaporation of the mixture only a reduced partial pressure of the mixture is reached. With the ratio proposed by way of example of 1.5 and a temperature of 75° C., the partial pressure of the mixture will only amount to about 60 kPa.

This completely vaporized mixture of the fuel, methanol, and the reaction partner, water, can be fed to the DMFC. In the DMFC itself in the conversion methanol and water are decomposed and carbon dioxide is produced so that at the operating temperature these substances can no longer be condensed and the fuel cell exclusively operated with a single phase. The individual steps, with reference to the temperature course according to the mentioned example can be the following:

Operating temperature of the DMFC: 100° C.
Boiling temperature of the coolant: 90° C.
Condensation temperature of the coolant: 90° C.
Temperature of the vapor-gas mixture: 75° C.
The molar composition of the vapor-gas mixture:
Methanol: 12.09%
Water: 18.31%
Carbon dioxide 69.68%
and the total pressure of this mixture of 170 kPa ensures that the temperature of the complete evaporation for the water and methanol mixture will lie below 75° C.

In a second advantageous variant, the manner of operation of the DMFC is so chosen that the waste heat from the DMFC directly suffices to evaporate the methanol water mixture and additionally maintain the operating temperature of the DMFC.

Especially the methanol-water mixture with the carbon dioxide can be provided as the coolant. The methanol-water mixture evaporated in the DMFC is then fed to the anode compartment of the DMFC. An external vaporization of the coolant along with associated apparatus can then be omitted. The heat losses which are unavoidably connected with a heat transport are also thus avoided. The temperature of the evaporated methanol-water mixture can thus be increased and the efficiency of the apparatus improved. The initial pressure of this mixture can then be correspondingly higher. Pressure losses can be overcome by corresponding means, for example by individual liquid jet pumps, driven by the fuel-water mixture at the inlet into the respective cooling layer of a fuel cell or by a multicell fuel cell block.

We claim:

1. A method of operating a direct methanol fuel cell which comprises the steps of:

(a) supplying methanol and water to an anode compartment of a direct methanol fuel cell having said anode compartment separated from a cathode compartment and in which methanol and water are converted to carbon dioxide and protons in the anode compartment and protons react with oxygen to form water in the cathode compartment with generation of heat;

(b) passing a coolant through said fuel cell to remove heat therefrom at least in part by evaporation of said coolant in said fuel cell to produce an evaporated coolant;

(c) vaporizing a methanol-water mixture in an evaporator to produce a vaporized methanol-water mixture;

(d) supplying heat to said evaporator by condensation of the evaporated coolant or supplying heat to said evaporator by utilizing the methanol-water mixture as a coolant for said fuel cell; and (e) feeding said vaporized methanol-water mixture to said anode compartment.

2. A method of operating a direct methanol fuel cell which comprises the steps of:

(a) supplying methanol and water to an anode compartment of a direct methanol fuel cell having said anode compartment separated from a cathode compartment and in which methanol and water are converted to carbon dioxide and protons in the anode compartment and protons react with oxygen to form water in the cathode compartment with generation of heat;

(b) passing a coolant through said fuel cell to remove heat therefrom at least in part by evaporation of said coolant in said fuel cell to produce an evaporated coolant;

(c) vaporizing a methanol-water mixture in an evaporator to produce a vaporized methanol-water mixture;

(d) supplying heat to said evaporator by condensation of the evaporated coolant or utilizing the methanol-water mixture as a coolant for said fuel cell;

(e) feeding said vaporized methanol-water mixture to said anode compartment; and (f) feeding an inert gas produced in said anode compartment to said methanol-water mixture.

3. The method defined in claim 2 wherein said methanol-water mixture is passed into heat exchange with said fuel cell to form a coolant therefor.

4. A direct methanol fuel cell system comprising:

a direct methanol fuel cell having an anode compartment separated from a cathode compartment and in which methanol and water are converted to carbon dioxide and protons in the anode compartment and protons react with oxygen to form water in the cathode compartment with generation of heat;

means for passing a coolant through said fuel cell to remove heat therefrom at least in part by evaporation of said coolant in said fuel cell to produce an evaporated coolant;

means forming an evaporator for vaporizing a methanol-water mixture to produce a vaporized methanol-water mixture;

means for supplying heat to said evaporator by condensation of the evaporated coolant or utilizing the methanol-water mixture as a coolant for said fuel cell;

a line for feeding said vaporized methanol-water mixture to said anode compartment; and means for feeding an inert gas produced in said anode compartment to said methanol-water mixture.

* * * * *